Dec. 12, 1933.  J. M. AUFIERO  1,939,032
MOTOR
Filed Oct. 19, 1932
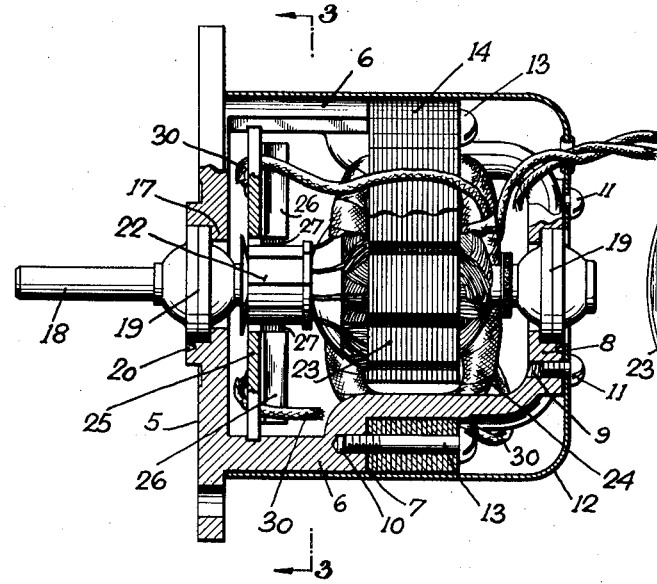
INVENTOR.
JOHN M. AUFIERO,
BY Duell, Dunn & Anderson.
ATTORNEYS.

Patented Dec. 12, 1933

1,939,032

UNITED STATES PATENT OFFICE 1,939,032

MOTOR

John M. Aufiero, Brooklyn, N. Y., assignor to E. A. Laboratories, Inc., Brooklyn, N. Y., a corporation of New York Application October 19, 1932. Serial No. 638,488

8 Claims. (Cl. 172—36)

This invention relates to a functionally and structurally improved motor capable of use in numerous different associations but primarily intended for use for light loads, such as occur in the operation of windshield wipers, fans, sewing machines, etc.

It is an object of the invention to provide an apparatus of this nature which may be manufactured in large quantities at nominal cost, in that it will embody relatively few parts, each individually simple and rugged in construction and capable of manufacture by automatic machinery, these parts being susceptible to assemblage by relatively unskilled labor and when so assembled, operating for long periods of time with freedom from mechanical and electrical difficulties.

A further object of the invention is that of constructing a motor which will require a minimum of attention and in which, moreover, the brushes may be renewed with facility when this becomes necessary. Moreover, according to the needs of the user, the motor may readily be constructed to provide for high, intermediate or low speeds.

With these and other objects in mind, reference is had to the attached sheet of drawing illustrating one practical embodiment of the invention and in which:

Fig. 1 is a partly sectional side view of a motor;

Fig. 2 is an end view thereof, and

Fig. 3 is a transverse sectional view, taken along the lines 3—3 and in the direction of the arrows in Fig. 1.

In these views the numeral 5 indicates the motor base, which is preferably die cast in order to be integral with arms or pole pieces 6 extending therefrom and which latter have shoulders or reduced portions 7 and are connected at their upper ends by a bridging part 8.

Thus it will be understood that by a single operation the entire frame of the motor may be provided without the necessity of assembling and fitting a multiplicity of parts. By automatic screw machines or otherwise, the bridging piece 8 may be formed with screw threaded openings 9 and screw threaded recesses 10 may be similarly provided in the face of the shoulders 7 and extending into the legs 6.

In this manner it is feasible, by means of screws 11, to connect a casing 12 to the unit, it being obvious that the outer faces of the legs 6 are formed to conform to the inner face of the casing—or vice versa—and that the casing preferably has its edge bearing against the upper face of the base 5 so that the parts are adequately sealed and any relative movement of the same is prevented. By utilizing screws 13, it is feasible to mount the field structure upon the lugs 6 and to retain the same in applied position, it being noted that this is a preferably laminated structure, as at 14, comprising a plurality of layers which may be wedged into position on the leg extensions beyond the shoulders 7. The screws 13, which are drawn tight after the layers have been wedged into position, serve to bring the same into tight and intimate contact with the shoulders and also prevent their separation through vibration of the motor when in use. Thus, the field structure is maintained against movement, and in connection with such wedging action it will be noted that the individual elements providing this unit are each preferably formed with an inwardly extending part 15, the leg extensions being channeled as at 16 to allow for an accommodation of such extensions.

The bridging portion 8 and the base 5 of the motor unit are formed at the time of manufacture with centrally aligned openings having oppositely disposed shoulder portions 17. Accordingly, it is practicable to slip the motor shaft 18 through these openings and to maintain the bearings 19 associated with such shaft against movement by simply striking—as at 20—portions of the material inwardly. In this manner the bearings are locked, it being, of course, noted that each bearing preferably has as a part of its structure an oil-receiving channel or port 21.

Now, referring to the brush assembly, it will of course be understood that the motor has a commutator 22 connected in the usual manner to the armature 23 and the field coils 24. The inner faces of the legs 6 are formed with transversely extending grooves to slidably accommodate a plate 25 formed of insulating material. This plate has brush housings 26 from which the spring-pressed brushes 27 extend into contact with the armature. The plate 25 also has, according to the illustrated embodiment, an extending portion 28, which projects materially to one side of the legs and is formed to conform to the inner face of the casing 12. Due to the extending portion 28, the plate may not slip beyond the position shown in Fig. 3, by reason of the fact that such extended portion contacts with the side edges of the legs 6. It may not move in the opposite direction, due to the fact that the extended portion contacts with the inner face of the casing and it may not move longitudinally of the shaft 18, due to the fact that it rides wihin the grooves formed in the inner faces of the legs 6. And obviously, the plate might be formed in numerous different manners in order to achieve the result taught by the present invention. As illustrated, it is preferred that the plate have notches 29 which serve as mountings or guides for the leads 30 which extend from the brushes.

Obviously, the base 5 may have extensions 31 which are perforated to accommodate mounting bolts. And the field coils 24 are simply bent to extend within notches 32 formed in the field unit 14, these coils at points beyond that unit being bent outwardly. Accordingly, these elements may readily be mounted and locked against movement.

Thus among others, the several objects of the invention, as specifically aforenoted, are achieved. Obviously, numerous changes in construction and rearrangements of the parts may be resorted to without departing from the spirit of the invention as defined by the claims.

Having described my invention, what I claim as new and desire to secure by Letters Patent is:

1. A motor including, in combination, a pair of legs, means for mounting the same, said legs being formed with exterior channels, a field unit encircling said legs and extensions forming a part of said unit and riding within said channels.

2. A motor including a pair of spaced legs, means for mounting the same, an armature rotatable with reference to said legs, means for mounting said armature, a brush mounting plate, said legs being formed with grooves to slidably and removably accommodate such plate and brushes secured to said plate and cooperating with the commutator of said armature.

3. A motor including a pair of spaced legs, means for mounting the same, an armature rotatable with reference to said legs, a brush mounting plate slidably disposed between said legs, an extension forming a part of said plate and engaging the side edges of said legs to limit the movement of said plate with reference to said legs.

4. A motor including a pair of spaced legs, means for mounting the same, an armature rotatable with reference to said legs, a brush mounting plate slidably disposed between said legs, a casing enclosing said legs and an extension forming a part of said plate and bearing against the inner face of said casing.

5. A motor including a pair of spaced legs, means for mounting the same, an armature rotatable with reference to said legs, a brush mounting plate slidably disposed between said legs, a casing enclosing said legs and an extension forming a part of said plate and interposed between the side faces of said legs and the inner face of said casing to prevent movement of said plate with respect to said legs.

6. A motor including, in combination, a pair of spaced leg members, field members disposed upon said leg members, certain of said members being formed with grooves, projecting portions forming parts of other of said members and slidably accommodated within said grooves whereby said members are retained against relative rotation and means for locking said field members in position against said leg members.

7. In combination, a motor field member, a rotatable armature shaft, means for rotatably supporting the same with respect to said field member, a commutator secured to said shaft, brushes cooperating with said commutator, a plate for mounting said brushes and formed with lead accommodating notches in its edge, and a casing extending beyond said notches and closing the same to prevent leads passing therethrough to be displaced therefrom.

8. As an article of manufacture, a motor frame including integral base legs and leg bridging portions, said leg bridging portions being formed with a bearing accommodating shoulder, a bearing for cooperation with said shoulder and a casing adapted to be positioned over said bearing to retain the latter from displacement with respect to the shoulder.

JOHN M. AUFIERO.